United States Patent [19]

Popper et al.

[11] 4,177,146

[45] Dec. 4, 1979

[54] METHODS AND APPARATUS FOR CONTINUOUSLY ENDOWING LIQUID WITH MECHANICAL ENERGY BY OSMOSIS

[76] Inventors: Karel Popper, P.O. Box 637, Willits, Calif. 95490; Wayne M. Camirand, 844 Madison St., Albany, Calif. 94706

[21] Appl. No.: 574,302

[22] Filed: May 5, 1975

[51] Int. Cl.² ............................................. B01D 13/00
[52] U.S. Cl. ............................... 210/137; 210/321 R; 60/326; 60/327; 60/721
[58] Field of Search ..................... 60/1; 210/23 H, 134, 210/137, 321 R, 321 D

[56] References Cited

U.S. PATENT DOCUMENTS

| | | | |
|---|---|---|---|
| 3,344,926 | 10/1967 | Barnabe et al. | 210/321 R |
| 3,423,310 | 1/1969 | Popper | 210/23 H |
| 3,587,227 | 6/1971 | Weingarten et al. | 60/1 |
| 3,825,122 | 7/1974 | Taylor | 210/137 X |
| 3,906,250 | 9/1975 | Loeb | 60/1 X |

*Primary Examiner*—Robert H. Spitzer
*Attorney, Agent, or Firm*—Paul M. Klein, Jr.

[57] ABSTRACT

Liquid is continuously endowed with mechanical energy by continuously osmosing it across an osmotic membrane across which is maintained a substantial pressure difference of osmotic pressures. Continuity is insured by continuously flowing hypotonic liquid against and away from the hypotonic surface of the membrane, continuously flowing hypertonic liquid against and away from the hypertonic surface of the membrane, and continuously flowing permeate essentially limitlessly away from the hypertonic surface. The substantial osmotic pressure difference across the membrane is maintained, in part, by keeping the hypertonic liquid at or near saturation.

3 Claims, 5 Drawing Figures

METHODS AND APPARATUS FOR CONTINUOUSLY ENDOWING LIQUID WITH MECHANICAL ENERGY BY OSMOSIS

BACKGROUND OF THE INVENTION

This invention relates to methods and apparatus for continuously endowing liquid with mechanical energy by osmosis.

For the sake of clarity the meanings of certain terms as used in this application will be defined. Osmosis involves a semi-permeable membrane, one surface of which is in contact with a first liquid and the opposite surface of which is in contact with a second liquid. The first liquid is a solution relatively more concentrated than the second solution, which latter may be either pure solvent, such as water, or may be a solution in which the solute concentration is less than that in the first solution. The first solution is said to be hypertonic relative to the second solution and may hereinafter be called simply the hypertonic solution. The surface of the membrane in contact with the hypertonic solution may be called the hypertonic surface of the membrane. The region of space containing the hypertonic solution and not including the membrane or the hypertonic surface of the will be designated the hypertonic side of the membrane. Corresponding meanings are used for the terms hypotonic solution, hypotonic surface of the membrane, and hypotonic side of the membrane.

Permeate, a verb, as herein used, means to pass from the region on one side of the membrane through the membrane and out of the membrane into the region on the other side of the membrane. Permeate, a noun, as herein used, means the liquid which permeates.

Concentration polarization is a term used to designate each of two phenomena: (1) the accumulation of a relatively concentrated solution in the vicinity of the hypotonic membrane surface interface by virtue of the osmotic permeation of solvent through the membrane and rejection by the membrane of solute and (2) the accumulation of relatively pure solvent, i.e. relatively dilute solution, in the vicinity of the hypertonic membrane surface interface by virtue of the emergence at that interface of essentially pure solvent permeating the membrane by osmosis. Osmosis will not occur when the concentration at the hypotonic interface equals that at the hypertonic interface. Moreover, as explained hereinafter, osmosis will not occur even when there is some difference in the concentrations at the opposite interfaces of the membrane if the osmotic pressure difference across the membrane due to that difference in concentrations is opposed by a hydrostatic pressure difference of equal magnitude across the membrane.

The mechanical energy with which a liquid can be endowed can be either potential energy or kinetic energy. The potential energy can be either in the form of pressure energy or elevation energy. The kinetic energy is that energy due to the velocity of the liquid. In engineering terms these energies per unit mass of liquid are called pressure head, elevation head, and velocity head.

The classical illustration of osmosis in elementary physics texts shows an inverted thistle tube closed at its larger end with a semi-permeable membrane, the tube containing a quantity of, for example, sugar solution, and the closed end being dipped in a body of, for example, water held in a container. The sugar solution is the hypertonic liquid. The water is the hypotonic liquid. In principle, to enable osmotic flow to occur through the membrane in the direction from the exterior of the thistle tube into the interior of the tube, the water need not be pure but may contain solute so long as the concentration of solute in it is less than that of the sugar solution contained in the tube. Essentially, pure water, the solvent here, flows by osmosis from the body of water in the container into the thistle tube where it rises and, indeed, under some conditions, may flow out of the open end of the thistle tube. If this process in progress is observed, it is seen that the water caused by osmosis to have flowed through the membrane has been endowed with mechanical energy. Choosing strategic locations to observe, the types of energy associated with the water are especially obvious. Those particles of water just entering the interior of the thistle tube at the hypertonic membrane surface interface are quite apparently endowed with pressure energy due to the pressure imposed on them by the weight of the column of liquid existing above them in the thistle tube. Of course they are also endowed with kinetic energy by virtue of the velocity at which they leave the membrane and enter the thistle tube, although this velocity is not so apparent at this location to the observer.

Looking at the free surface of the liquid rising in the thistle tube, or the liquid flowing out of the open end of the thistle tube, as the case may be, it is quite apparent that the permeate is endowed with elevation energy, indicated by the height to which the liquid has risen in the tube, above its initial level, and with kinetic energy, indicated by the velocity with which the liquid is rising in the tube or overflowing out of it.

It is apparent from the foregoing that in order to continuously endow liquid with energy by osmosis, there must be continuous osmotic flow or permeation; that is, continuously liquid must enter an osmotic membrane from the hypotonic side, flow through the membrane, and then flow away from the membrane on the hypertonic side.

Inasmuch as the open end of the thistle tube does not confine the permeate to an enclosed region of space but, on the contrary, allows the permeate to escape and thus flow to any indefinite distance away from the membrane, it might seem, at first blush, that this osmotic process of endowing liquid permeate with mechanical energy could continue indefinitely so long as there was a supply of hypotonic liquid in contact with the hypotonic surface of the membrane.

In fact, this process is discontinuous and will end within a readily foreseeable time interval. In order for osmosis to take place the liquid at the interface with the hypertonic (i.e. downstream) surface of the membrane must always be hypertonic relative to that at the hypotonic (i.e., upstream) surface of the membrane. The functional relation between the osmotic flow through the membrane and the relative tonicities of these two liquids will be apparent from the following.

The rate of permeation of the liquid through such an osmotic membrane is given by $dQ/dt = KA(\Delta P - \Delta \pi)$, where $dQ$ is the quantity of water transported in time $dt$; $A$ is the area of the membrane; $\Delta P = P_o - P_r$, where $P_o$ is the hydrostatic pressure on the exterior (hypotonic) surface of the membrane and $P_r$ the hydrostatic pressure on the interior (hypertonic) surface of the membrane; and $\Delta \pi = \pi_o - \pi_r$, where $\pi_r$ is the osmotic pressure of the liquid in contact with the interior (hypertonic) surface of the membrane and $\pi_o$ is the osmotic pressure of the liquid in contact with the exterior (hypotonic) side of the membrane. The osmotic pressure of each liquid is a monotonic increasing function of the concentration of solute in the liquid.

Assuming that the overflow from the thistle tube is conducted away from the container in which the tube is immersed so that the overflow does not mix with the liquid in the container, it is apparent from the foregoing equation that flow through the membrane will cease as soon as the liquid in the thistle tube in contact with the hypertonic surface of the membrane exhibits such a concentration, i.e. such a state of dilution, that its osmotic pressure has a value such that $\Delta\pi$ just equals the then-existing $\Delta P$.

As previously stated, the permeate is essentially pure water. As this pure water emerges from the membrane on the hypertonic side it constitutes, at the moment of emergence, the liquid in contact with the hypertonic surface of the membrane. If it were to form a residual, essentially stagnant layer at the hypertonic interface, then osmosis would thereupon cease because there would then be zero difference in concentrations and hence in osmotic pressure between the liquids in contact with the opposite surfaces of the membrane. Since osmotic permeation is not a turbulent flow, such a stagnant layer does tend to form in the absence of the provision of some force to cause rapid mixing of the permeate with the body of hypertonic liquid. No such force exists in the thistle tube apparatus.

The only source for hypertonicity on the hypertonic side of the membrane is the discrete, unreplenished body of hypertonic solution initially installed in the thistle tube. The permeate dilutes this discrete body of liquid which initially, in its undiluted state, and thereafter in its diluted states, contitutes the entire bulk of the solution located on the hypertonic side of the membrane at all significant times and at such a place as conceivably to be capable of participating in osmosis through the membrane. Osmotic flow will cease when the dilution reduces the osmotic pressure of the hypertonic liquid to the extent that the difference, $\Delta\pi$, of osmotic pressures at the two interfaces of the membrane no longer exceeds the hydrostatic pressure difference across the membrane.

Other pertinent prior art is illustrated by U.S. Pat. No. 3,423,310. This patent shows a direct osmosis cell having, in effect, two compartments separated by an osmotic membrane, one of the compartments capable of being supplied essentially continuously with a hypotonic solution, and the other compartment being supplied prior to initiation of osmosis with a discrete body of hypertonic liquid and, during osmosis, being essentially sealed to prevent influx of any additional hypertonic liquid and being operated so as, in effect, to prevent efflux from the compartment of permeate originating from the hypotonic solution and emerging from the membrane into the hypertonic compartment. All the elements constituting the boundaries of the hypertonic-liquid-containing compartment are essentially rigid and immovable with the exception of one. That one is formed to be capable of transmitting pressure from the hypertonic liquid in the direct osmosis cell to hypertonic liquid in a reverse osmosis cell to be powered by the energy with which the permeate in the direct osmosis cell is endowed. That element is also so formed and installed that, in coaction with the structure and operating characteristics of the other components of the direct osmosis cell it is capable of being displaced, at least in part, over a limited distance so as to transmit pressure to, and remain in pressure-transmitting relation over that limited displacement with, a surface of the hypertonic liquid in the reverse osmosis cell as that surface recedes by virtue of efflux of permeate from the reverse osmosis cell in response to the pressure exerted by the pressure-transmitting element. The pressure-transmitting element is exemplified variously in the patent by an elastic, liquid-tight diaphragm; a piston of liquid immiscible with the two hypertonic liquids; a gas piston; a solid, rigid, free piston; and an interface between the two hypertonic liquids which is established by, and whose integrity is maintained by, respectively, initially positioning the denser of the two liquids below the other and operating the cell so as to minimize mixing.

The process of the aforementioned Popper patent is discontinuous. That is, the process can proceed for only a clearly limited time interval and will then cease. For one thing, even assuming that there is constantly maintained across the direct osmosis cell membrane a favorable osmotic pressure difference tending to drive permeate from the hypotonic side thereof through that membrane to the hypertonic side thereof, the permeate cannot continuously flow away from the hypertonic side. Ultimately the flow away from the hypertonic side would cease when the hypertonic compartment, which is of finite volume, become full. It can be said to be full when the displaceable boundary element (whose displacement contributes to the total available finite volume of the hypertonic compartment) has, by the influx into the hypertonic compartment of permeate, been displaced to such an extent that, by virtue of either external force on it, or the stress developed in its material, the resistance it exhibits to further displacement balances the force tending to drive additional permeate through the osmotic membrane.

In actual practice the osmotic flow will cease even sooner than suggested by the foregoing analysis. The patent itself, indicates that, as its operation proceeds, the liquid in the hypertonic compartment of the direct osmosis cell becomes dilute and therefore the osmotic pressure difference across the direct osmosis membrane, which is what drives the permeate through the membrane, is reduced. As is apparent from the flow rate equation previously set forth, the flow through the direct osmosis membrane will cease, and hence also will the endowing of the permeate with energy, when the hydrostatic pressure built up in the hypertonic compartment and opposing osmotic flow just equals the then existing osmotic pressure difference across the membrane.

SUMMARY OF THE INVENTION

An object of the invention is to provide methods and apparatus for continuously endowing liquid with mechanical energy by osmosis.

The invention involves continuously producing osmotic flow through an osmotic membrane by continuously contacting one surface of the membrane, designated as the upstream or hypotonic surface, with a supply of hypotonic liquid; simultaneously, continuously contacting the opposite surface of the membrane, designated as the downstream or hypertonic surface, with a supply of hypertonic liquid, and essentially continuously maintaining a substantial difference between the tonicity, that is, the osmotic pressure ( a function of concentration) of the liquid at the hypertonic surface interface and that of the liquid at the hypotonic surface interface. These features of the invention are accomplished by essentially continuously maintaining the tonicity of the liquid at the hypotonic interface within a desired range, its value being relatively close to, if not substantially equal to, that generally representative of the supply of hypotonic liquid; essentially continuously maintaining the tonicity of the liquid at the hypertonic interface within a desired range, its value being relatively close to, if not substantially equal to, that generally representative of the supply of hypertonic liquid; maintaining at a magnitude below that of the osmotic pressure difference across the membrane the hydrostatic pressure difference across the membrane, if any, in the sense opposing osmotic flow; and continuously flowing permeate essentially limitlessly away from the hypertonic side of the membrane.

Continuous flow of permeate away from the hypertonic side of the membrane is distinguished from discontinuous flow, exemplified by flow (as in the cited Popper patent) into an enclosed, finite region of space, which flow is automatically terminated when the enclosed region is "full." Continuous flow of permeate implies flowing the liquid essentially limitlessly away from the membrane or essentially flow into limitless space, i.e., unenclosed space, and can be variously described as flow to an essentially infinite distance or indefinitely great distance away from the membrane, or flow into the atmosphere or into free space or empty space, or simply space; or into a region exposed to the atmosphere or into a body of liquid so large compared to the permeate that the permeate does not significantly affect the prevailing characteristics of that body of liquid. Such a flowing away of the permeate implies that when so continuously flowed essentially limitlessly away from the hypotonic surface it no longer influences the hypertonicity at the hypertonic surface interface nor does it impede or obstruct by hydrostatic pressure continued permeation across the osmotic membrane. In other words, permete flowed essentially limitlessly away from the hypertonic surface means that, under a steady state condition of continuous flow of permeate, permeate becomes either so distant from the vicinity of the hypertonic surface, or so diffuse or mixed with so huge a quantity of other liquid, or exhibits more than one of these characteristics, to the extent that this permeate, per se, has no perceptible influence at the hypertonic surface on the factors governing continued permeation, viz. osmotic pressure difference across the membrane and hydrostatic pressure difference across the membrane.

The continuous endowment of a liquid with energy by osmosis achieved by this invention refers to the acquisition by only the continuously flowing permeate, by virtue of only its osmosing through the membrane, of mechanical energy in the form of one or more of the following: elevation head, pressure head, and velocity head. If does not refer to the acquisition by either the permeate or other liquids of such energy from sources other than osmosis.

Since the tonicity, or osmotic pressure, of a liquid depends on the concentration of solute in it, the tonicity can be maintained within a desired range by keeping the concentration within a desired range. To keep the concentration within the desired range at the hypertonic interface in this invention means continuously replacing the pure water emerging from the membrane at the interface with solution of the desired concentration. This can be done by (1) adding solute to the pure water layer formed at the interface or (2) by flowing the pure water layer away from the interface and replacing it with solution of the desired concentration, or (3) by mixing with the pure water layer so large a quantity of solution in the desired concentration range supplied by the main body or supply of hypertonic liquid that whatever liquid thereafter remains in contact with the hypertonic surface of the membrane exhibits a concentration within the desired range. In preferred embodiments of the invention, a combination of (2) and (3) are used wherein a supply of hypertonic solution is continuously flowed against and then away from the hypertonic surface of the membrane thus both mixing with and sweeping away the emerging pure water permeate at the hypertonic interface. This insures that the hypertonic membrane surface is always being contacted with solution whose concentration lies within the desired hypertonic range, such solution being constituted either by the hypertonic solution per se flowed against the hypertonic surface of the membrane or by that hypertonic solution diluted by mixing with the emerging pure water permeate but still having a concentration within the desired range. The requirement of the invention that permeate be flowed continuously away from the hypertonic side of the membrane is not only compatible with (2) and (3) but is actually accomplished as an incident of the accomplishment of (2) and (3).

To keep the concentration of the liquid at the hypotonic membrane interface within its desired range presents no problem if that liquid is pure solvent, such as pure water, since then the desired concentration is automatically maintained at zero. However, if that liquid is a solution, as commonly happens, then the following takes place. That portion of the hypotonic solution initially in contact with the hypotonic surface of the membrane constitutes what may be called an interfacial layer of solution situated at the interface of the membrane hypotonic surface. Its concentration is generally that of the main body of hypotonic solution. Osmosis causes the solvent component (e.g. pure water) of that initial interfacial layer of solution to pass through the membrane while the solute component of that initial interfacial layer, being rejected by the membrane, is taken up by that portion of the main body of hypotonic liquid, which was contiguous to the initial interfacial layer. That portion of the main body of hypotonic liquid now becomes the new interfacial layer as it flows into place against the hypotonic surface of the membrane to replace the permeate emanating from the initial interfacial layer. The new interfacial layer now contains not only the solute it originally had as being part of the main body of the hypotonic solution but also, in addition, the solute rejected into it by the membrane from the initial interfacial layer as the solvent from that initial interfacial layer permeated osmotically across the membrane. The new interfacial layer is thus more concentrated than the initial interfacial layer, i.e., more concentrated than the main body of hypotonic solution.

As solvent from the new interfacial layer in turn osmoses across the membrane the next formed interfacial layer becomes even more concentrated. Continuation of this process would soon raise the concentration of some interfacial layer beyond the limit of the range desired for solution in contact with the hypotonic surface of the membrane. Keeping the concentration of the solution in contact with the membrane hypotonic surface within the desired range can be done by flowing away from the membrane hypotonic surface the new interfacial liquid layer which has been enriched to greater concentration by receiving solute rejected from the initial interfacial layer and replacing that new interfacial layer by some of the main body of hypotonic liquid whose concentration lies within the desired hypotonic range. Also it can be done by mixing with the new concentrated interfacial layer so large a quantity of hypotonic solution in the desired concentration range that whatever liquid thereafter remains in contact with the membrane hypotonic surface exhibits a concentration within the desired hypotonic range. In preferred embodiments of the invention, a combination of these two procedures is used.

To maximize osmotic flow preferred embodiments of the invention maintain the solution on the hypertonic side of the membrane at or near saturation. To maintain at or near saturation the supply of hypertonic solution continuously flowed against the hypertonic surface of the membrane preferred embodiments of the invention add solute in solid form to that supply essentially continuously.

DESCRIPTION OF PREFERRED EMBODIMENTS

Figure 1:
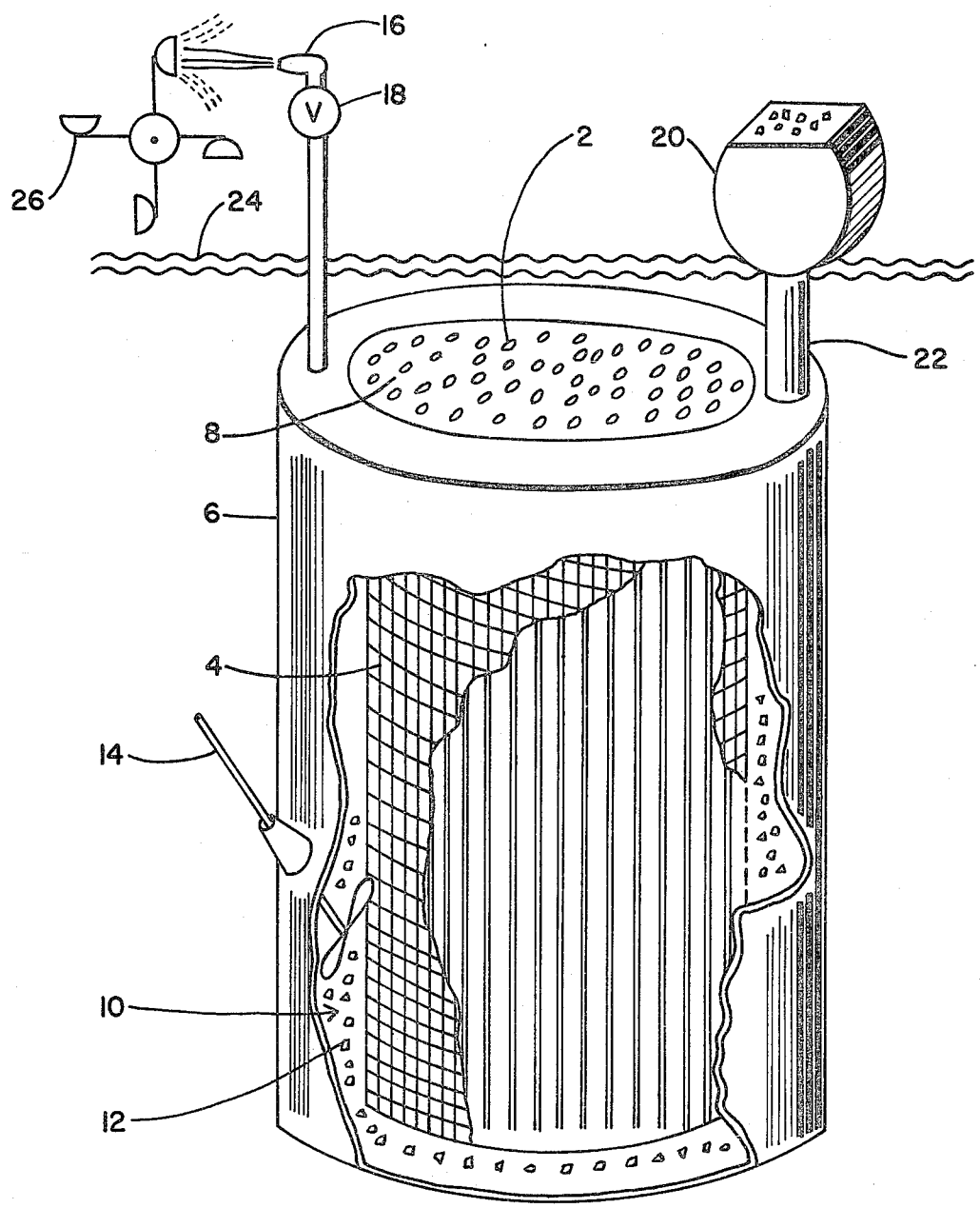
FIG. 1 is an axonometric drawing, partially broken away, of one embodiment of apparatus of the invention using osmotic membrane in the form of a bundle of hollow fibers with seawater as the hypotonic liquid and a sodium chloride solution as the hypertonic liquid.

In FIG. 1 of the drawing is shown an apparatus of the invention using a commercially available osmotic membrane in the form of a bundle of hollow fibers 2. The fibers 2 are held together by a loose screen 4 and are inserted longitudinally in a cylinder 6. The ends of the fibers 2 are embedded in a suitable cement 8 at the ends of the cylinder. The annular space 10 between the hollow-fiber-containing screen 4 and the cylinder 6 is supplied with crystalline sodium chloride 12 to maintain the solution in the annular space at saturation. The annulus 10 is provided with a suitable mixing mechanism, exemplified by a stirrer 14 driven by any suitable power source not shown. The annulus 10 is also provided with an outlet, shown as nozzle 16, governed by a valve 18.

A lock-type crystal feeding valve 20, of any suitable conventional design, is used to maintain an adequate supply of sodium chloride crystals in annulus 10. The lock-type valve 20 is so called because of its resemblance to an air lock, which is an air tight chamber, located between regions of different pressure, in which the pressure can be regulated, typically by exposing the chamber alternately to the pressure in each of the two regions. The valve 20 operates, as is well known, in the manner of a revolving door to seal the port 22 of the annulus but nevertheless allow for repeated feeding of crystals into the annulus.

The cylinder is immersed vertically in seawater 24. Seawater, constituting the hypotonic solution, contacts the interior, hypotonic surface of the tubular osmotic membranes while the saturated sodium chloride solution (constituting the hypertonic solution) in the annulus 10 contacts the exterior, hypertonic surface of the membranes. By osmosis the pure water component of the interfacial layer of seawater in contact with the interior, hypotonic surface of each tubular membrane permeates through the membrane into the annulus 10. As pure water leaves that interfacial layer of seawater the salts rejected by the membrane concentration in what now remains as the interfacial layer thus rendering that layer denser than the main body of seawater. By virtue of the vertical orientation of the cylinder 6 and the open lower ends of the tubular membranes the denser solution, is caused, under the force of gravity, to sink down and out of the membrane tubes into the main body of seawater outside of the cylinder. The denser solution which leaves the tube is simultaneously replaced by normal sea water flowed by the action of gravity into the tubular membrane. Thus, by what might be called a density current or convective transport, the interfacial layer of hypotonic solution at the membrane hypotonic surface, when it becomes more concentrated then the main body (normal sea water) of hypotonic solution, is flowed away from the hypotonic membrane surface and in the process thereof is replaced by and mixed with normal hypotonic liquid (sea water). Having left the lower end of the tubular membrane and entered into the relatively hugh main body of sea water exterior to the cylinder, this denser solution is diluted back to the normal concentration range of sea water without noticeably changing the concentration of the main body of sea water.

By virtue of the mixing produced by stirrer 14 and the presence of crystalline sodium chloride 12 in the annulus 10, replenished, as needed, by the crystal feed valve 20, the solution in the annulus, forming the main body of hypertonic solution, is always maintained as essentially a saturated solution. The pure water osmosing from the sea water across the membranes into the annulus 10 is promptly flowed away from the hypertonic surface of the membranes and replaced with saturated sodium chloride solution by virtue of the currents generated by the stirrer 14. In the process, it is mixed with the saturated sodium chloride solution in the annulus. Thus the interfacial layer of liquid in contact with the membrane hypertonic surface is essentially always kept within the desired range of hypertonicity.

When the valve 18 is opened, saturated sodium chloride solution gushes forth from the nozzle 16 and can be used to perform work. If the apparatus is on a watercraft or other body movably suspended within, or on the surface of, the sea, the stream from the nozzle 16 can be ejected directly into the surrounding sea water and thus from a drive mechanism for such floating bodies. In the embodiment selected for illustration the stream is shown driving a water wheel 26 of the Pelton type. The gushing stream includes the permeate endowed with energy by osmosis through the membrane. Since the gushing stream continuously flows ultimately into the atmosphere or free space or the sea inasmuch as it is not confined to any enclosed region of space, it is apparent that permeate is thereby continuously flowed essentially limitlessly away from the hypertonic side of the osmotic membrane.

In the illustrated embodiment the salt is sacrificed, i.e. lost to the sea. However, the invention contemplates also, as illustrated by other embodiments described hereinafter, the recovery of the salt for re-use. In such embodiments the salt solution, after performing work on a prime mover rotor, for example, is evaporated as by spraying in the air and/or exposure in a pond.

To appreciate the order of magnitude of the pressure available from osmosis it may be noted that with the aforedescribed sea water—saturated sodium choloride solution pair, there exists an osmotic pressure difference of about 310 atmospheres. This means that a pressure of that magnitude less the pressure drop due to the resistance of the osmotic membrane can be achieved in the annulus 10.

While the embodiment of FIG. 1 uses a sea water-sodium chloride solution pair for illustration, other systems can be used according to the invention such as, for example, magnesium chloride, magnesium sulfate, or calcium chloride in combination with sea water or fresh water.

Figure 2:
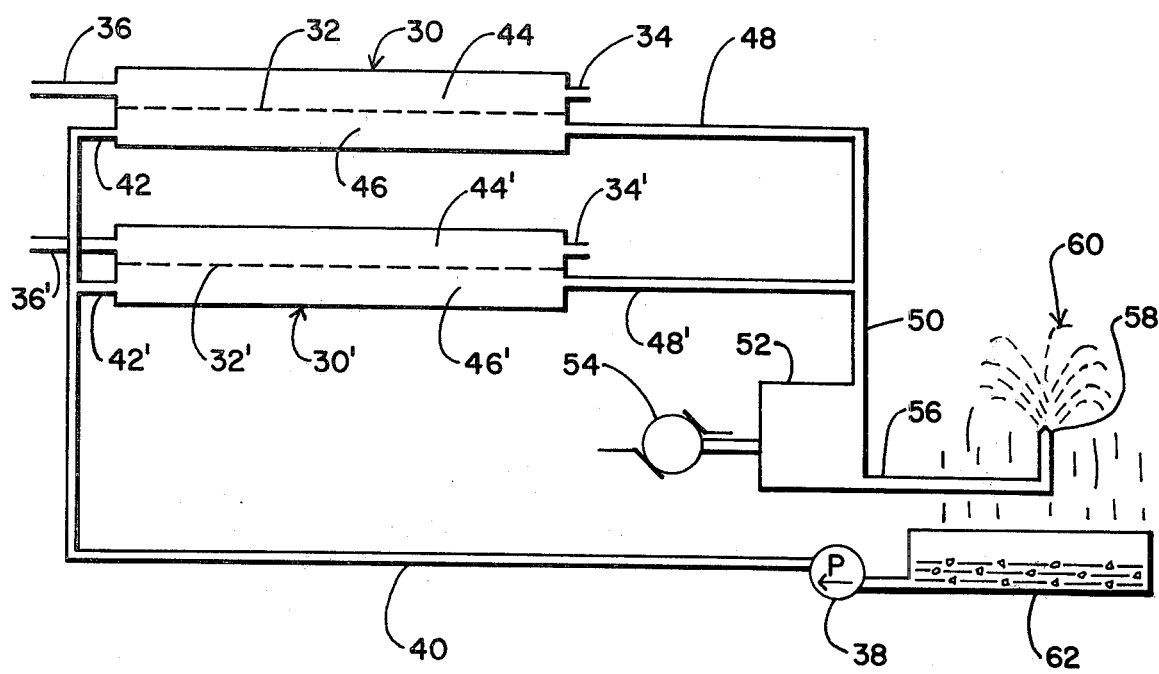
FIG. 2 is a schematic drawing of an embodiment of an apparatus in which all of the hypertonic liquid leaving osmosis cells is used to drive a prime mover and then partially evaporated to yield solid solute re-used for hypertonic liquid supplied from a receptacle open to the atmosphere.

In FIG. 2 is shown schematically an embodiment of the apparatus of the invention wherein salt is re-used. By spraying, evaporation of some solvent (e.g. water) from the used salt solution is accelerated and a slurry results which is pumped back to the osmotic-membrane-containing pressure generating vessel. In FIG. 2, 30 and 30' designate generally two, of what may be many, osmosis cells having osmotic membranes 32 and 32'. Hypotonic solution, which may be fresh water, brackish water, or sea water, for example, enters the cells through ports 34, 34' and leaves, somewhat more concentrated (unless originally pure water) via outlets 36, 36'. By any convenient means not shown, it is caused to flow at a rate sufficient to prevent undesired concentration polarization.

Salt water is pumped by pump 38 via pipe 40 through ports 42, 42' to the hypertonic sides of the membranes 32, 32'. Water permeates by osmosis from the hypotonic chambers 44, 44' through the membranes into the hypertonic chambers 46, 46' where it is mixed with the slurry and swept along out of the pressure generating vessels 30, 30'. through ports 48, 48' and thence, via pipe 50, to drive the prime mover 52, which may be a turbine, water wheel, or the like. Energy can typically be extracted from the system via a generator 54 driven by the prime mover.

The solution leaves the prime mover 52 under residual pressure via duct 56 whence it enters a spray nozzle 58 from which it emerges as a fine mist 60. Much of the water is evaporated at a fast rate. The remaining water and salt crystals fall into a inclined container 62 whence, as a slurry, they supply the feed to pump 38.

While the pump 38 operates at a pressure essentially equal to that existing in the duct 50, on a per unit time basis, the volume pumped by the pumps is less than that flowing in the duct 50. The flow in the duct 50 includes, in addition to the volume supplied by the pump 38, the water emerging, because of osmosis, across the membrane from the hypotonic side onto the hypertonic side. The difference in volume between that flowing in duct 50 and that pumped in the duct 40 represent the gross energy gain of the system which is the energy with which the permeate is endowed by osmosis in passing from the hypotonic side of the membrane through the membrane to its hypertonic side. In this embodiment osmosis must drive the permeate through the membrane against the pressure existing in the chambers 46, 46' by virtue of the pump 38 and the resistance to flow through ducts 48, 48', and 50, the housing of prime mover 52, duct 56, and nozzle 58.

Preferably the composition and flow rate of the slurry entering chambers 46, 46' are such that the permeate dissolves essentially all the salt crystals and there issues, therefore, from ducts 48, 48' only an essentially saturated solution to drive the prime mover 52. Should crystals of salt remain in the effluent from chambers 46, 46' they are preferably removed from the solution by any suitable means, not shown, and deposited directly in container 62.

Conveniently the rate of evaporation of water from nozzle 58 is adjusted to be essentially equal to the rate of permeation through the osmotic membranes so that the level of slurry in the container 62 is maintained essentially constant. Permeate, which even before reaching nozzle 58 is already mixed with so huge a quantity of slurry from duct 40 as to no longer influence conditions at the hypertonic membrane surface, is discharged continuously from nozzle 58, not into an enclosed finite region of space but into the essentially infinite space of the atmosphere where it either diffuses or is mixed with a relatively huge quantity of salt slurry in container 62. Thus it is apparent that in this embodiment permeate is flowed continuously essentially limitlessly away from the hypertonic surface of the membranes.

Since the drawing of the FIG. is schematic it should be understood that in an actual model of the apparatus relative elevations of the various components are not at all necessarily as shown in the figure nor are the osmosis cells necessarily oriented with the membranes horizontal and the other elements necessarily oriented as shown.

Figure 3:
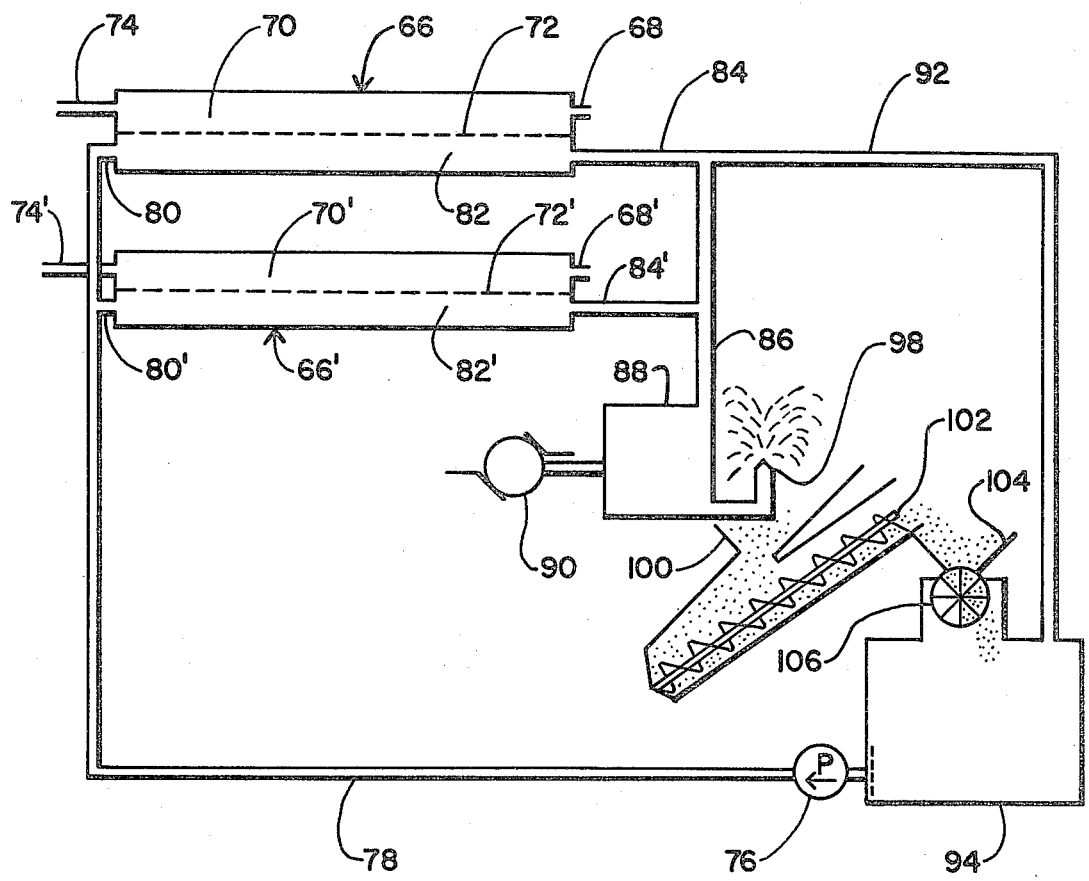
FIG. 3 is a schematic drawing of an apparatus similar to that of FIG. 2, except that part of the hypertonic liquid leaving the cells passes not through the prime mover but in a closed, pressure-tight system in which it is enriched for a re-use by solid solute obtained by evaporation of the prime mover effluent and injected into the closed system.

In FIG. 3 is shown an embodiment apparatus of the invention in which essentially dry crystals of salt are fed into the slightly diluted hypertonic solution emanating from the osmosis cells and that solution, thereby enriched to hypertonicity desired for osmosis, is then reused in the osmosis process. The prime mover of this apparatus is arranged to be driven by a portion of the hypertonic liquid issuing from the osmotic cells that is essentially equal in amount to the permeate provided by the cells. By evaporation of that portion of the hypertonic liquid are produced the salt crystals to be fed into the diluted hypertonic solution scheduled for re-use in osmosis and they are fed at essentially the same rate at which they are produced.

Osmosis cells 66, 66' are supplied via ports 68, 68' with hypotonic solution flowed from any convenient source through the hypotonic chambers 70, 70' against, along, and away from the hypotonic surface of the osmotic membranes 72, 72', leaving the osmotic cells via ports 74, 74'. The rate of flow is sufficient to prevent undesired concentration polarization. Salt solution is pumped by pump 76 via conduit 78 and ports 80, 80' into hypertonic chambers 82, 82' of the osmosis cells and then into contact with and away from the hypertonic surface of the osmotic membranes at a rate adequate to prevent undesired concentration polarization. The flow out of the hypertonic chambers through ducts 84, 84' is constituted by the liquid fed in through circuit 78 augmented by and diluted by the permeate emerging from the membranes. A portion of the total liquid issuing from the chambers 82, 82' essentially equal to the amount of permeate is run through conduit 86 to drive the prime mover 88 producing, for example, electrical energy by generator 90. The remainder of the liquid emanating from hypertonic chambers 82, 82' is led by duct 92 to a salt enrichment vessel 94.

The portion of liquid used to drive the prime mover 88 is, by residual pressure, sprayed into the atmosphere through nozzle 98 after issuing from the prime mover housing. The spraying evaporates the water from the liquid and the salt crystals thereupon formed are collected as by a hopper 100. A suitable means such as screw conveyor 102 conveys the salt crystals to a hopper 104 whence they are fed into the salt enrichment vessel 94 by a suitable means such as a lock-type feeding star valve 106. The salt fed by the star valve returns the hypertonic solution entering vessel 94 to the desired degree of concentration and this reconstituted hypertonic solution is then ready for distribution by pump 76 to the pressure generating osmotic cells 66, 66'.

In this embodiment the pump 76 operates against essentially only frictional head losses since the pressures in ducts 78 and 92 are otherwise substantially identical.

For reasons similar to those set forth in the description of FIG. 2, it is clear that nozzle 98 provides for continuously flowing permeate essentially limitlessly away from the hypertonic surface of membrane 72, 72'.

Figure 4:
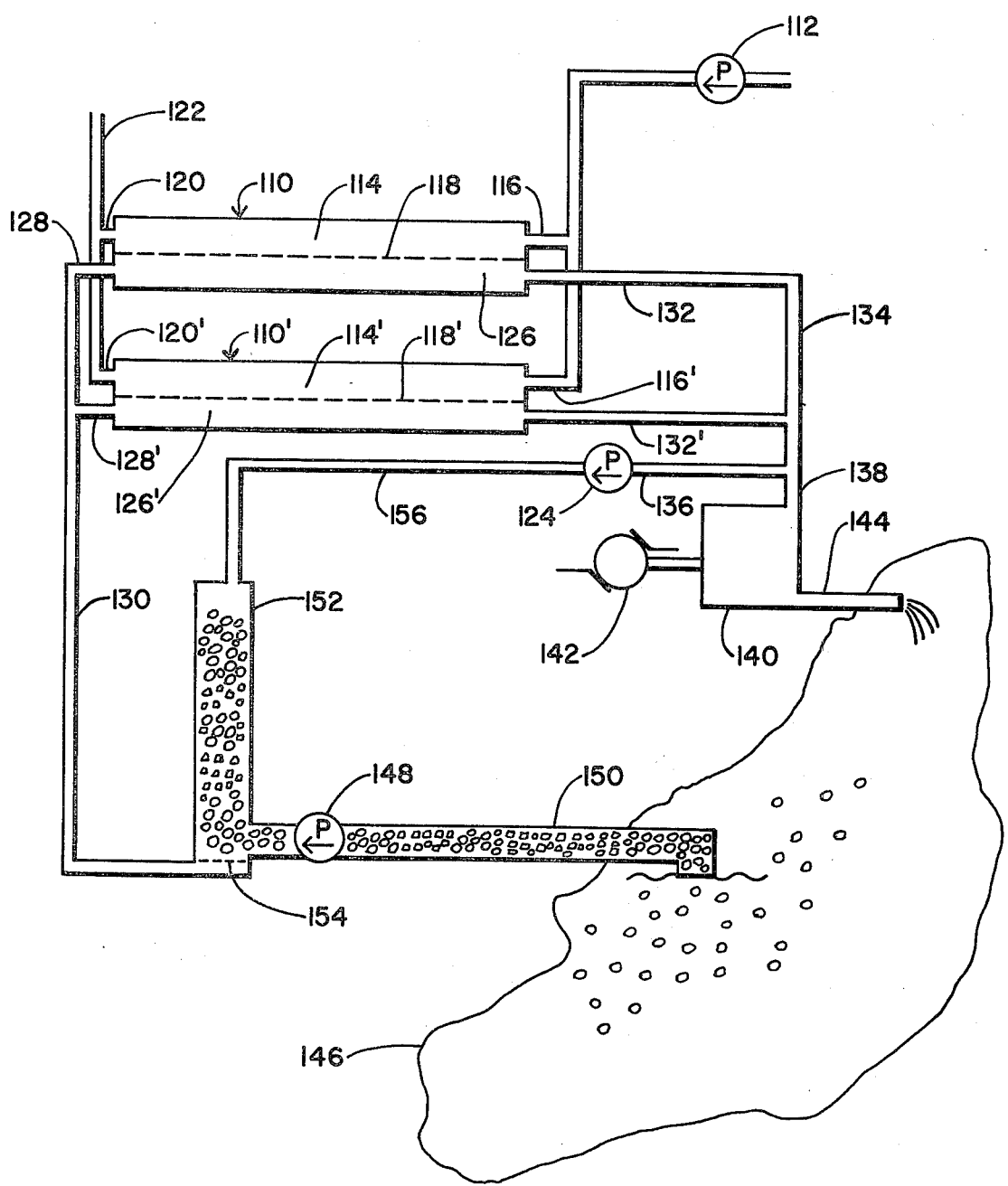
FIG. 4 is a schematic drawing of an apparatus similar to that of FIG. 3 except that the solute obtained from the prime mover effluent is, under pressure, injected into the closed system as a slurry.

In FIG. 4 is shown an embodiment of apparatus for the invention wherein part of the hypertonic solution issuing from the osmosis cells is restored for re-use to desired concentration by passing it over a salt column in an essentially closed circulation system. The column is maintained full of salt by high pressure input of salt slurry from an evaporation pond or similar receptacle.

Osmosis cells 110, 110' are supplied with hypotonic solution by any convenient means such as pump 112. This solution enters the hypotonic chambers 114, 114' by ports 116, 116', contacts the hypotonic surface of membranes 118, 118' and leaves through ports 120, 120' and duct 122. Hypertonic solution circulated by pump 124 enters hypertonic chambers 126, 126' through ports 128, 128' supplied by conduit 130. After passing into contact with the hypertonic surface of membranes 118, 118', the hypertonic liquid leaves the membrane and flows out of the hypertonic chambers 126, 126' via ducts 132, 132' into conduit 134 whence a portion of it is fed into pump 124 via pipe 136 and the remainder, by pipe 138, is used to drive the prime mover 140 producing, for example, electrical energy by generator 142.

The portion of hypotonic liquid used to drive the prime mover leaves the prime mover housing at duct 144 to enter a receptacle such as an evaporation pond 146. Slurry formed in this pond constitutes the input to pump 148 via conduit 150. This pump pumps the slurry into column 152 where, by virtue of screen 154, the salt from the slurry is retained and used to enrich to the desired concentration range the hypertonic solution emanating from the osmosis cells and diluted by the permeate. The pump 124 pumps that hypertonic solution via conduit 156 through the column of salt on its way to re-use via duct 130 into the osmotic cells.

The pump 124, operating in what amounts to a low resistance closed system need be only a low pressure circulating pump. The pump 148 must be capable of injecting slurry into the relatively high pressure existing within the system. The amount of liquid used to drive the prime mover approximately equals the sum of the permeate plus the saturated solution fed to the system by pump 148.

For reasons analogous to those set forth in the description of FIG. 2, it is clear that duct 144 provides for continuously flowing permeate essentially limitlessly away from the hypertonic surface of membranes 118, 118'.

Figure 5:
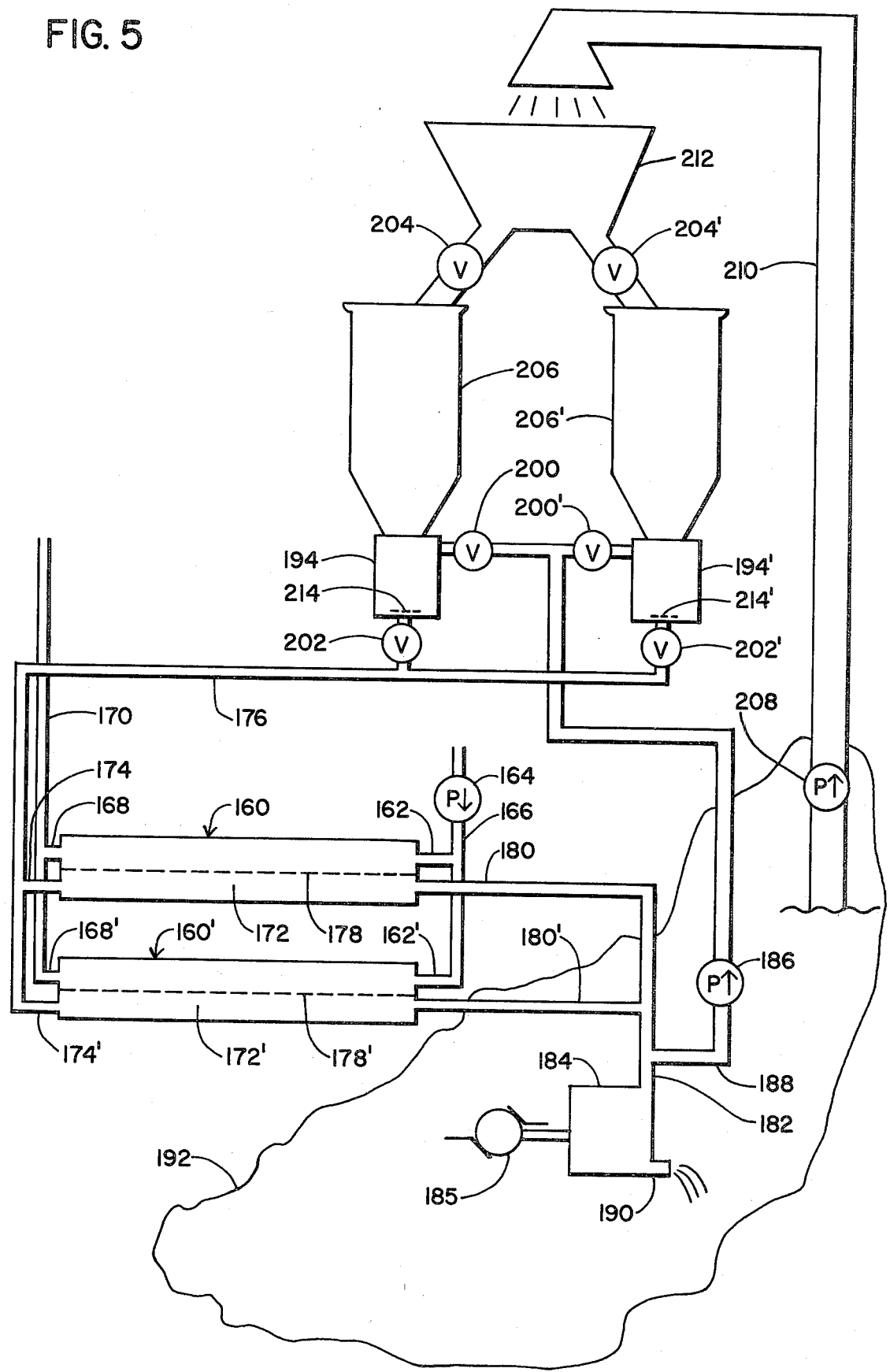
FIG. 5 is a schematic drawing of an apparatus similar to that of FIG. 4 except that the slurry is added to the closed system by a pair of alternately used container assemblies, each being supplied with slurry while it is isolated from the closed system and open to the atmosphere and is then closed off from the atmosphere and connected into the closed system.

In FIG. 5 is shown schematically an embodiment of apparaus similar to that of FIG. 4 except that the high pressure slurry pump is replaced by a pair of alternately used container assemblies each having a column and a dissolving chamber.

As in previously described embodiments, osmosis cells 160, 160' are supplied through ports 162, 162' with hypotonic solution arriving from pump 164 via duct 166. The hypotonic solution leaves the cells via ports 168, 168' and duct 170. Hypertonic solution is supplied to the hypertonic chambers 172, 172' through ports 174, 174' from conduit 176. After contacting the hypertonic side of the membranes 178, 178' the hypertonic solution, now diluted and augmented by the permeate, leaves the osmosis cells via conduit 180, 180'. It then is split into two portions, one of which flows through conduit 182 to drive the prime mover 184 producing energy by generator 185 and the other of which enters pump 186 through conduit 188. That portion which drives the prime mover flows via duct 190 into an evaporative receptacle such as a solar pond 192. The other portion of the hypertonic effluent from the osmosis cells is pumped by pump 186 alternately into dissolving chambers 194 and 194' of the respective container assemblies.

When the hypertonic liquid from pump 186 is being pumped into chamber 194, valves 200, and 202 and 204' are open and valves 200', 202' and 204 are closed. At this time the container assembly comprising feeder column 206 and dissolving chamber 194 is full of heavy salt slurry earlier supplied by pump 208 via duct 210 to hopper 212 whence the slurry was dropped into feeder column 206 at a time when valve 204 was open. During the interval while hypertonic liquid from pump 186 is being pumped into chamber 194, slurry is being pumped by pump 208 via duct 210 into hopper 212 whence it passes through open valve 204' and fills the other container assembly comprising feeder column 206' and dissolving chamber 194'.

The diluted hypertonic solution pumped by pump 186 passses into contact with the salt crystals in dissolving chamber 194 thus becoming saturated and passes then through valve 202 and conduit 176 back to re-use in the hypertonic chambers of the osmosis cells. Salt crystals are prevented by screen 214 from passing out of chamber 194.

When feeder column 206 and its assosiated dissolving chamber 194 are depleted of salt crystals the operation is switched to alternate feeder column 206' and its associated dissolving chamber 194' by closing valves 200, 202, and 204' and opening valves 200', 202', and 204. During the use of dissolving chamber 194' for enrichment of the diluted hypertonic solution effluent from the osmosis cells, the feeder column 206 and dissolving chamber 194 are being refilled with slurry preparatory to taking their next turn in the enrichment procedure.

This embodiment is preferably arranged so that the amount of hypertonic liquid used to drive the prime mover is essentially equal to the amount of permeate.

For reasons analogous to those used in the description of the embodiment of FIG. 2, it is clear that duct 190 provides for continuously flowing permeate essentially limitlessly away from the hypertonic surface of membrane 178, 178'.

As clearly shown in various FIGS. of the drawing, the invention comprehends the use of counterflow to maximize osmosis. That is, for example, in FIG. 3, hypotonic liquid in its most hypotonic condition enters the osmotic chamber 66 and 68 where it encounters on the opposite side of the membrane hypertonic liquid about to exit at 84 in its most dilute, i.e. least hypertonic condition. From this it can be seen that everywhere along the membrane the greater practical difference in osmotic pressures across the membrane is maintained consistent with the facts that the hypotonic solution in passing from 68 to 74 necessarily becomes less hypotonic and the hypertonic solution in passing from 80 to 84 necessarily becomes less hypertonic.

Preferred embodiments of the invention, as seen from the foregoing examples, use saturated solution on the hypertonic side of the osmotic membranes. This is so because the invention comprehends the realization that the work output of such systems varies as a parabolic function of the concentration of the liquid on the hypertonic side of the membranes. For example, if the embodiment of FIG. 2 used sea water as the hypertonic solution and fresh water as the hypotonic solution there would be obtained, say, one unit of energy per unit of permeate. If, however, a saturated sodium chloride solution were used instead of sea water, 14 units of energy would be obtained per unit of permeate. This is clearly a significantly higher value that that corresponding to the mere difference in solute concentration since the solute concentration of saturated sodium chloride solution is only 8.7 times that of sea water.

What is claimed is:

1. Apparatus for endowing liquid with energy by osmosis comprising an osmosis cell including an osmotic membrane and a sealed chamber having the hypertonic surface of said membrane as one of its boundaries;
   a lock-type valve for feeding solid solute into said sealed chamber;
   a governable outlet for said chamber from which liquid can issue;
   means for creating turbulence in liquid within said chamber; and
   the hypotonic surface of said membrane being so exposed and said apparatus being adapted to be so oriented that liquid can flow against and the away from the hypotonic surface under the action of gravity.

2. Apparatus for endowing liquid with energy by osmosis comprising an osmosis cell;
   means for continuously flowing hypotonic liquid against and then away from the hypotonic surface of the membrane of said cell;
   means for continuously flowing hypertonic liquid against the hypertonic surface of said membrane;
   means for, at least in part, then flowing said hypertonic liquid together with permeate emerging across said membrane, away from said membrane to a prime mover to drive said prime mover;
   means for causing said liquid, as it issues from said prime mover, to evaporate into the atmosphere, at least in part, so as to produce solute in solid form from said liquid;
   means for embodying said solute in a relatively concentrated liquid constituting a source of the hypertonic liquid for said second mentioned means to flow against said hypertonic surface of said membrane, said means for embodying said solute in a relatively concentrated liquid comprising a closed chamber and a lock-type feed valve for feeding solid solute into said chamber;
   means for conveying to said feed valve for feeding to said chamber solid solute formed by evaporation of the effluent from said prime mover;
   means for flowing a part of the hypertonic liquid and permeate away from said hypertonic surface into said closed chamber; and
   means for supplying hypertonic liquid from said chamber to said means for continuously flowing hypertonic liquid against said membrane, all of said five means immediately hereinbefore mentioned, except said conveying means, being arranged in a pressure-tight closed system.

3. Apparatus for endowing liquid with energy by osmosis comprising an osmosis cell;
   means for continuously flowing hypotonic liquid against and then away from the hypotonic surface of the membrane of said cell;
   means for continuously flowing hypertonic liquid against the hypertonic surface of said membrane;
   means for, at least in part, then flowing said hypertonic liquid together with permeate emerging across said membrane, away from said membrane to a prime mover to drive said prime mover;
   means for causing said liquid, as it issues from said prime mover, to evaporate into the atmosphere, at least in part, so as to produce solute in solid form from said liquid;
   means for embodying said solute in a relatively concentrated liquid constituting a source of the hypertonic liquid for said second mentioned means to flow against said hypertonic surface of said membrane, said means for embodying said solute in a relatively concentrated liquid constituting means for producing a slurry;
   a pressure-tight closed system comprising a solid-solute-containing column for retaining solid solute therein but allowing liquid to pass through said column, said liquid being in contact with said solute as it passes through said column;
   means for flowing a part of the hypertonic liquid and permeate away from said membrane through said column in contact with said solute in said column and then back to the hypertonic side of said membrane to be flowed against said hypertonic surface; and
   means for feeding solid-solute-containing slurry from said slurry-producing means into said column to provide said solute retained in said column.

* * * * *